United States Patent
Urbanski et al.

(10) Patent No.: US 7,317,132 B2
(45) Date of Patent: Jan. 8, 2008

(54) METHOD FOR UTILIZATION OF RUBBER WASTES BY SIMULTANEOUS PYROLYSIS WITH COAL

(75) Inventors: Zbigniew Urbanski, Katowice (PL); Jozef Bujarski, Katowice (PL); Jerzy Beck, Katowice (PL); Ryszard Depczynski, Katowice (PL)

(73) Assignee: Zbigniew Urbański, Katowice (PL)

( * ) Notice: Subject to any disclaimer, the term of this patent is extended or adjusted under 35 U.S.C. 154(b) by 59 days.

(21) Appl. No.: 10/530,417

(22) PCT Filed: Oct. 7, 2003

(86) PCT No.: PCT/PL03/00102

§ 371 (c)(1),
(2), (4) Date: Nov. 21, 2005

(87) PCT Pub. No.: WO2004/031325

PCT Pub. Date: Apr. 15, 2004

(65) Prior Publication Data
US 2006/0122443 A1 Jun. 8, 2006

(30) Foreign Application Priority Data
Oct. 7, 2002 (PL) .................................... 356498

(51) Int. Cl.
*C01D 3/00* (2006.01)

(52) U.S. Cl. ...................... 585/241; 201/25; 423/449.7
(58) Field of Classification Search .................. 201/25; 423/449.7; 585/241
See application file for complete search history.

(56) References Cited

U.S. PATENT DOCUMENTS 4,463,203 A * 7/1984 Gi .............................. 585/241
4,507,174 A * 3/1985 Kutrieb ....................... 202/97

* cited by examiner

*Primary Examiner*—Glenn Caldarola
*Assistant Examiner*—Prem C. Singh
(74) *Attorney, Agent, or Firm*—Rabin & Berdo, P.C.

(57) ABSTRACT

Method for utilization of rubber wastes with simultaneous carrying of pyrolysis of coal in cells of a coke oven battery, in which each consequent cell is filled with previously prepared and disintegrated blend of coke coals of a size of particles 0.1-5.0 mm in amount of 95-99% by weight a rubber granulate is added in a form of a rubber grain of a size of particles 0.1-5.0 mm in amount of 1-5% by weight, and thus formed mixture of coking coals charge and rubber grain is thickened by a mechanical compacting till an uniform structure of a whole charge is obtained, and then a process for utilization of rubber wastes is carried out in a closed system without an access of oxygen in a temperature of at least 900° C. with a simultaneous pyrolysis of coal.

1 Claim, No Drawings

METHOD FOR UTILIZATION OF RUBBER WASTES BY SIMULTANEOUS PYROLYSIS WITH COAL

The subject of the invention is a method for utilization of rubber wastes with simultaneous performance of pyrolysis of coking coal, particularly compositions of various coking coals in the cells of a coke oven battery.

Hitherto, rubber wastes in the form of used rubber products such as car tires, tubes, conveyor belts, hoses, etc., are subjected in a limited range to mechanical manufacturing to obtain so called "grinding product". However, a remarkable majority of rubber wastes is directed to waste dumps or it is burned in the open air, with access to oxygen in waste combustion plants or in a rotary furnaces in cement factories.

Such utilization of rubber wastes causes contamination and degradation of the natural environment and a loss of valuable materials, which can be reused for production of rubber articles.

The method according to the invention for utilization of rubber wastes with a simultaneous performance of coking coal pyrolysis, including filling of cells of a coke oven battery with a charge of a previously prepared and disintegrated blend of coking coals according to the invention is characterized in that to each charge of the blend of coking coals of a size of particles 0.1-5.0 mm in an amount of 95-99% by weight, a rubber granulate is added in the form of a rubber grain of a size of particles 0.1-5.0 mm in an amount of 1-5% by weight, in coking plants with a compacting system for filling the cells.

In the coking plants with a gravitational charge filling system, the preferable size of particles is between 0.1 and 20.0 mm. Formed in this way, a mixture of the coking coals and the rubber grain is thickened by mechanical compacting until a uniform structure of a whole charge is obtained. A process for utilization of rubber wastes is carried out in a closed system without access to oxygen, at a temperature of at least 900° C. with a simultaneous pyrolysis of coal.

The invention remarkably decreases the an emission of harmful materials produced by the conventional method that performs a combustion of rubber wastes with access to oxygen in open systems. The invention further decreases contamination and degradation of the natural environment, and eliminates wastes. Moreover, the invention enables a recovery of carbon derivatives, which can be reused directly for production of rubber articles in a chemical industry.

EXAMPLE 1

A blend of coking coals is prepared and disintegrated in a ball grinder provided with an appropriate sieves to obtain a grain size of 1-5 mm. The above-mentioned blend of coals is placed in an amount of 14,850 kg in one cell of a coke oven battery. Then, 150 kg of rubber grain of particle size 5 mm is added to the coal blend already placed in a coke oven battery cell. The composition of the coking coals and the rubber grain is compacted mechanically to obtain a homogenous structure of a whole charge. In the same way, filling of other cells of the coke oven battery is performed, using siloes containing previously prepared and disintegrated coking coals and rubber grain.

After filling the cells, a process for utilization of rubber wastes is performed in a closed system without access to oxygen, without forming wastes, in a temperature of 900° C., with a simultaneous pyrolysis of coal.

When finished, a process for utilization of rubber wastes performed in each cell of the coke oven battery yields: coke in an amount of 11,400 kg, ammonia in an amount of 35.25 kg, benzene in an amount of 183 kg, tar in an amount of 745.5 kg, coke oven gas in an amount of 5,034 Nm.

EXAMPLE 2

Proceeding as shown in Example 1, each cell of a coke oven battery is filled with coking coals in an amount of 14,550 kg and rubber grain in an amount of 450 kg.

After a process for utilization of rubber wastes is completed, the following products are obtained from each cell: coke in an amount of 11,460 kg, ammonia in an amount of 35.25 kg, benzene in an amount of 183 kg, tar in an amount of 745.5 kg, coke oven gas in an amount of 5,043 Nm.

As can be concluded from the above examples, depending on the ratio of coking coals and rubber grain, the process for utilization of rubber wastes with a simultaneous pyrolysis of coal, yields various amounts of products, and can control the amounts of products according to needs.

The invention claimed is:

1. Method for utilization of rubber wastes with simultaneous performance of pyrolysis of coal in cells of a coke oven battery, in which each cell is filled with a previously prepared and disintegrated blend of coking coals, comprising the steps of:

adding a rubber granulate in the form of a rubber grain of a size of particles 0.1-5.0 mm in an amount of 1-5% by weight, to each charge of the blend of coking coals of a size of particles 0.1-5.0 mm in an amount of 95-99% by weight in each cell of the coke oven battery with a gravitational charge filling system for filling particles having a size between 0.1 and 20.0 mm;

thickening a composition of the coking coals and the rubber grain formed by said step of adding, by mechanical compacting until a uniform structure of a whole charge is obtained; and performing a process for utilization of rubber wastes in a closed system without access to oxygen, at a temperature of at least 900° C. with a simultaneous pyrolysis of coal.

* * * * *